US006705179B1

(12) United States Patent
Mohtasham

(10) Patent No.: US 6,705,179 B1
(45) Date of Patent: Mar. 16, 2004

(54) MODIFIED ROPE TENSIONER

(75) Inventor: Mehdi Mohtasham, Astley (GB)

(73) Assignee: EJA Limited, Wigan (GB)

( * ) Notice: Subject to any disclaimer, the term of this patent is extended or adjusted under 35 U.S.C. 154(b) by 0 days.

(21) Appl. No.: 09/675,242

(22) Filed: Sep. 29, 2000

(51) Int. Cl.[7] .......................... G05G 1/08; F16G 11/00; B66D 1/36

(52) U.S. Cl. .......................... 74/505; 74/506; 74/502.6; 74/606 R; 24/134 R; 24/134 KA; 254/335; 254/336; 254/337

(58) Field of Search .......................... 74/501.5 R–502.6, 74/575–577 M, 505, 545, 606 R, 506; 24/712.1, 712.5, 713.5, 134 R, 136 R, 134 KA; 254/335, 337, 338

(56) References Cited

U.S. PATENT DOCUMENTS

| | | | | | |
|---|---|---|---|---|---|
| 664 | A | * | 4/1838 | Brown | 470/131 |
| 349,031 | A | * | 9/1886 | Cook | |
| 810,042 | A | * | 1/1906 | Duncan | 114/218 |
| 1,243,105 | A | * | 10/1917 | Richardson | |
| 1,962,964 | A | * | 6/1934 | Morrison | 24/134 |
| 2,226,393 | A | * | 12/1940 | Seeger et al. | 24/134 |
| 2,444,841 | A | * | 7/1948 | Meronk | 211/119.15 |
| 4,323,725 | A | * | 4/1982 | Muller | 174/65 R |
| 4,399,979 | A | * | 8/1983 | Adelman | 254/338 |
| 4,798,098 | A | * | 1/1989 | Keller et al. | 74/470 |
| 4,817,452 | A | * | 4/1989 | Burkey | 74/522 |
| 4,830,340 | A | * | 5/1989 | Knitig | 254/391 |
| 4,899,423 | A | * | 2/1990 | Randall | 24/134 R |
| 4,961,544 | A | * | 10/1990 | Bidoia | 242/54 R |
| 5,070,805 | A | * | 12/1991 | Plante | 114/218 |
| 5,167,059 | A | * | 12/1992 | Plasse et al. | 29/433 |
| 5,435,044 | A | * | 7/1995 | Ida | 24/136 R |
| 5,548,873 | A | * | 8/1996 | Macias | 24/134 R |
| 5,788,176 | A | * | 8/1998 | Ebner et al. | 242/374 |
| 6,041,676 | A | * | 3/2000 | Bettenhausen | 74/545 |
| 6,418,592 | B1 | * | 7/2002 | Mohtasham | 24/134 P |
| 6,446,936 | B1 | * | 9/2002 | Ostrobrod | 254/368 |
| 6,502,286 | B1 | * | 1/2003 | Dubberke | 24/712.1 |
| 6,662,739 | B1 | * | 12/2003 | Radford | 114/218 |

FOREIGN PATENT DOCUMENTS

| | | | | |
|---|---|---|---|---|
| BE | 555340 | * | 3/1957 | 74/606 R |
| CH | 324480 | * | 11/1957 | 74/575 |
| DE | 004320854 A1 | * | 1/1995 | B60R/22/28 |
| EP | 001136723 A2 | * | 9/2001 | F16G/11/10 |
| EP | 001255262 A2 | * | 11/2002 | H01H/3/42 |
| GB | 1047211 | * | 1/1966 | 74/575 X |
| JP | 57-191189 | * | 11/1982 | B63H/9/08 |
| JP | 2-191830 | * | 7/1990 | 74/501.5 R |
| WO | WO 97/20334 | | 6/1997 | |

* cited by examiner

*Primary Examiner*—Vinh T. Luong
(74) *Attorney, Agent, or Firm*—Quarles & Brady; William R. Walbrun

(57) ABSTRACT

A rope tensioner sets the tension of a rope operated switch assembly actuable to switch between first and second conditions on a change in tension of the rope. The tensioner comprises a body, a rotatable member which engages the rope, a shaft for rotating the member relative to the body to adjust tension in the rope by winding the rope around the member, and a lock to lock the member in position relative to the body. The rope opperated switch assembly is much simpler to install than previous assemblies, as the tensioner may be simply threaded or otherwise installed onto the rope without the rope having to be cut.

16 Claims, 9 Drawing Sheets

MODIFIED ROPE TENSIONER

TECHNICAL FIELD

The present invention relates to a rope tensioner which may be used to tension a rope operated switch assembly. Such an assembly may be used, particularly but not exclusively for controlling the power supply to kinetic machinery.

BACKGROUND ART

Rope operated switch assemblies are generally fitted in proximity to a machine or around any area which requires protection, and comprise two safety switches and a rope extending between the switches such that the electrical power supply may be turned off when the rope is pulled or slackened (e.g. if the rope is cut). In some applications, only one switch is provided, the end of the rope being connected to the single switch and the other end being connected to for example a spring secured to a fixed point. The rope is generally a plastics-coated metal wire or cable, and extends around the machine so that an operator can easily reach it from any position adjacent the machine. The term "rope" used hereinafter is intended to mean any elongate flexible element that is suitable for using in a rope operated switch assembly, for example, metal cable, cord formed of twisted elements or fibres such as wire, polymeric material, etc., which may optionally be coated with a plastics material.

The rope must be installed at the correct tension so that the machinery can be operated but so that a relatively small change in the tension of the rope will actuate the switch assembly. This is important because an injured operator may not be able to pull the rope with much force.

The installation of the rope at the correct tension is difficult to achieve. The rope must first be installed between the two switches, and is then pulled into an approximation of the correct tension. A turnbuckle is installed in the centre of the rope by cutting the rope and fixing the turnbuckle between the rope sections using thimbles and cable clamps. Once installed, the tension in the rope is set by adjusting eye bolts on the turnbuckle until the rope switches are pulled into a "run" position, that is, with safety contacts in the switches made. The turnbuckle then allows small alterations to be made to the tension of the rope to allow for expansion or contraction of the rope due to, for example, temperature differences.

Placement of the turnbuckle in the rope is a time-consuming and often difficult process, and can take up a large proportion of the total time taken to install the rope switch assembly. The setting of the correct tension in the rope is particularly difficult, as the switches must be continually checked to ensure that the switch mechanisms are in the correct position in order that the rope is not set at an incorrect tension. As the turnbuckle ideally is placed towards the centre of the rope to allow for even tensioning, the turnbuckle may be some distance from the switches.

In addition, the turnbuckle only allows small differences in tension in the rope to be corrected for. If the tension alters by more than can be dealt with using the turnbuckle, the slack or expansion must be dealt with by movement of the thimbles and cable clamps along the rope segments. A large alteration in tension can occur, for example, due to large temperature fluctuations in different seasons, especially on long runs of rope.

DISCLOSURE OF INVENTION

It is an object of the present invention to obviate or mitigate such disadvantages with prior art systems.

According to a first aspect of the present invention there is provided a rope operated switch assembly comprising a rope extending to at least one switch, the switch being actuable to switch between first and second conditions on a change in tension of the rope, and a tensioner for setting the tension of the rope, wherein the tensioner comprises a body, a rotatable member which engages the rope, means for rotating the member relative to the body to adjust tension in the rope by winding the rope around the member, and locking means to lock the member in position relative to the body.

The tensioner may be simply threaded or otherwise installed onto the rope during installation of the rope operated switch assembly, without the need to cut the rope. The installation is thus much simpler than with prior art switch assemblies.

The locking means preferably comprises a ratchet and pawl. Preferably, means displaceable relative to the body are provided to move the pawl out of engagement with the ratchet, thereby unlocking the shaft to release the tension in the rope. The displaceable means may comprise a screw that may be screwed into the body.

A plate is preferably provided to separate the tensioner into two compartments, the rope extending into one compartment, and the locking means being provided in the other compartment. This means that the rope does not become entangled in the locking means whilst the tensioner is being installed along the rope.

The tensioner is preferably provided adjacent the switch, meaning that the installation may be effected quickly as the operator can easily check the state of the adjacent switch as the tension in the rope is altered.

According to a second aspect of the present invention there is provided a method of installing a rope operated switch assembly comprising connecting the rope to at least one switch which is actuable to switch between first and second conditions on a change in tension of the rope, the rope being initially installed such that an approximation of the correct tension is achieved in the rope, and increasing the tension in the rope by means of a tensioner, wherein the tensioner comprises a body and a rotatable member which engages the rope, the tension in the rope being increased by rotating the rotatable member relative to the body such that the rope is wound around the member, and locking the rotatable member in position relative to the body after the rope has been tensioned.

The tension of the rope is preferably monitored as the tension is increased by viewing a tension indicator provided on the at least one switch. The tensioner is preferably placed close to an end of the rope, adjacent to the at least one switch, for ease of viewing of the tension indicator provided on the switch.

Unlocking means are preferably provided in the tensioner so that the tension of the rope may be released.

According to a third aspect of the present invention, there is provided a rope tensioner comprising a body defining a passage through which a rope can be inserted to project from each end of the passage, a member rotatable relative to the body and formed to engage a rope extending through the passage such that rotation of the member causes the rope to be wound around the member, and means for locking the member in position relative to the body to resist unwinding of the rope from the member.

The means for rotating the rotatable member around which the rope is wound may be a drive member mechanically coupled by a gear to the rotatable member. The drive member may be a worm gear meshed with a gear supported by the rotatable member. The locking means may be provided by providing a gear system with a mechanical advantage such that unwinding of the rope from the rotatable member is prevented unless the drive member is rotated to drive the rotatable member in a direction to unwind the rope.

The rotatable member is preferably a shaft defining an aperture aligned with openings in the tensioner body.

The locking means preferably comprises a ratchet and pawl assembly.

Preferably the tensioner comprises means for releasing the locking means.

BRIEF DESCRIPTION OF DRAWINGS

An embodiment of the present invention will now be described by way of example with reference to the accompanying drawings, in which.

BEST MODES FOR CARRYING OUT THE INVENTION

Figure 1:
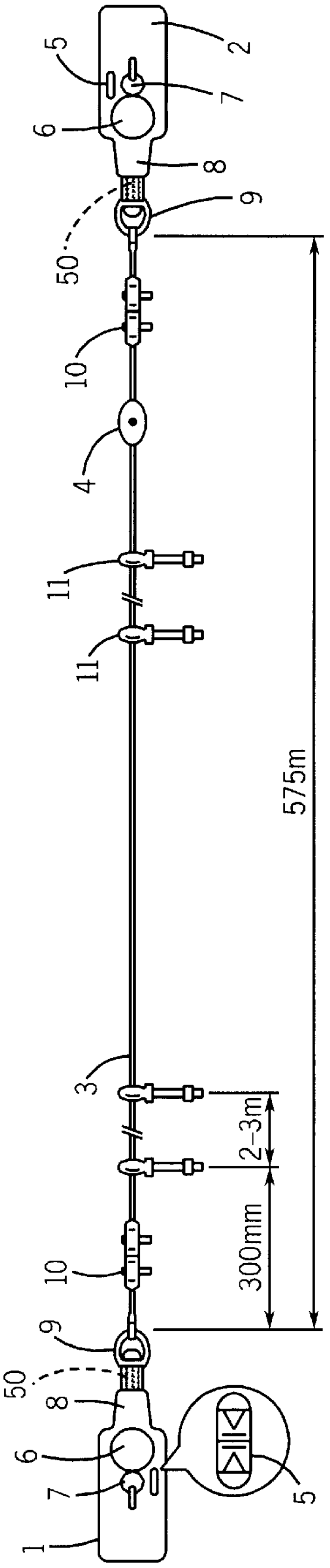
FIG. 1 is a plan view of a rope operated switch assembly according to the present invention.
Figure 2:
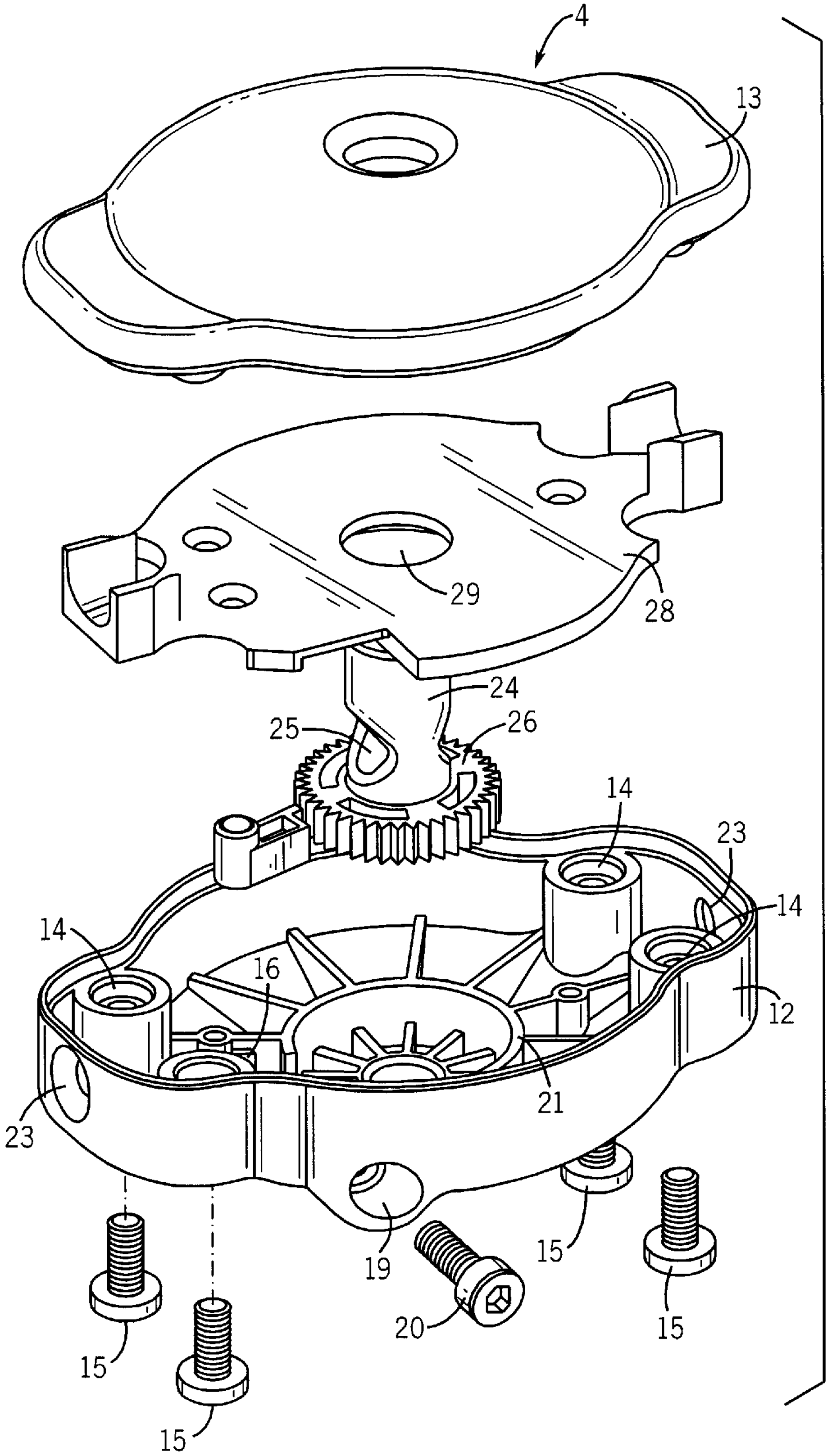
FIG. 2 is an exploded perspective view of a tensioner for use in the rope operated witch assembly of FIG. 1.
Figure 3:
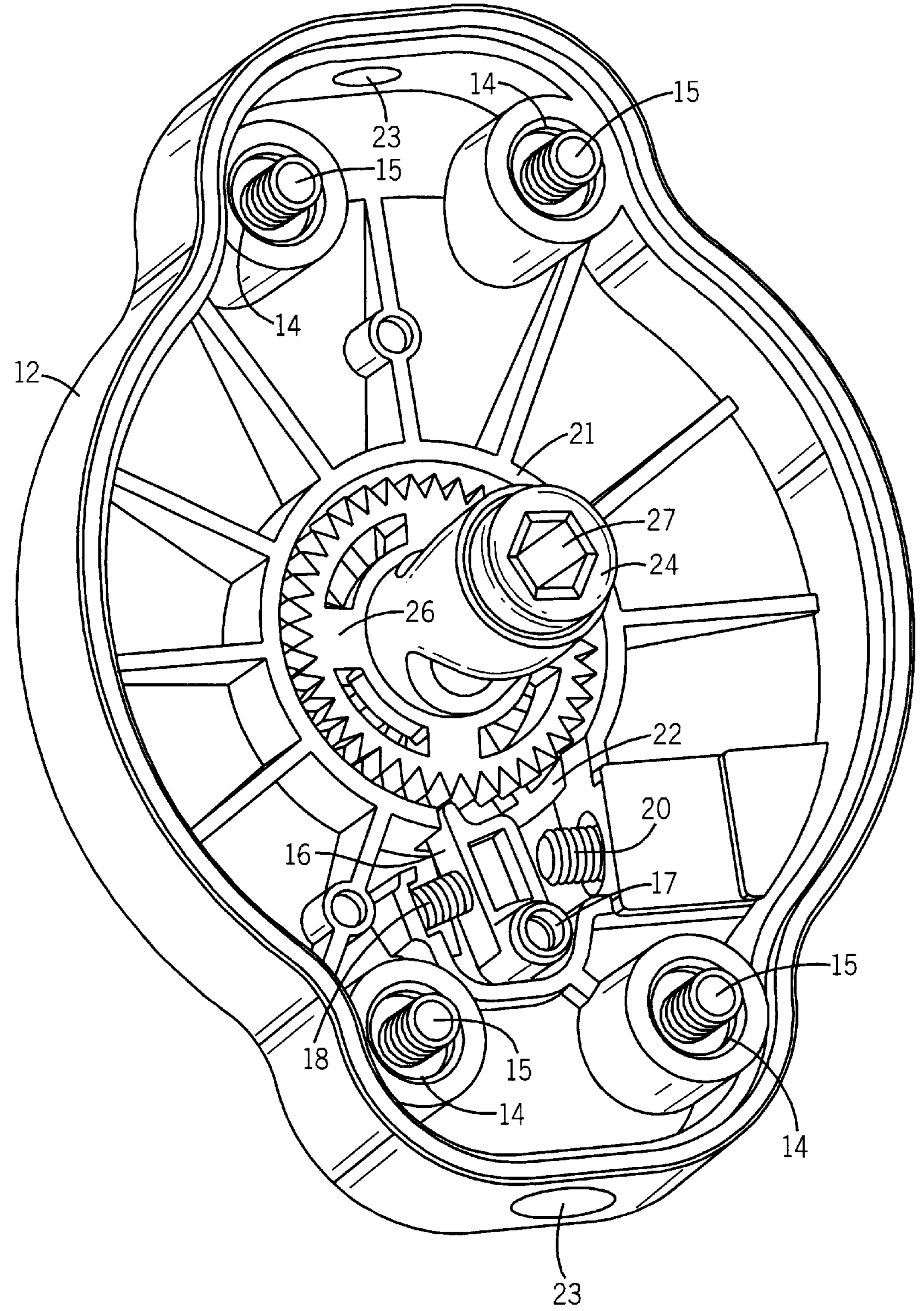
FIG. 3 is a perspective view of the base of the tensioner of FIG. 2.
Figure 4:
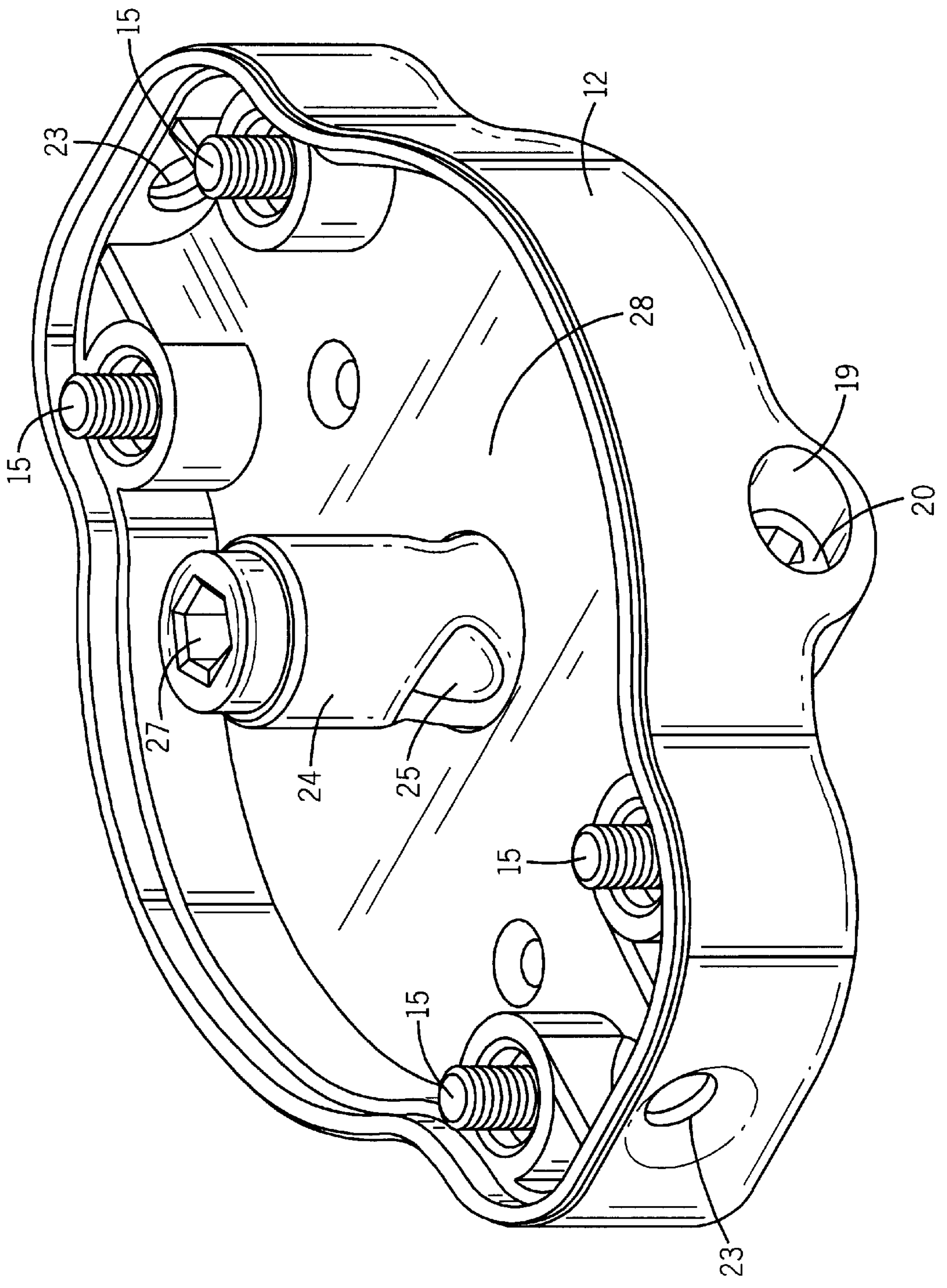
FIG. 4 is a perspective view of the base of the tensioner of FIG. 3, with a cover plate.
Figure 5:
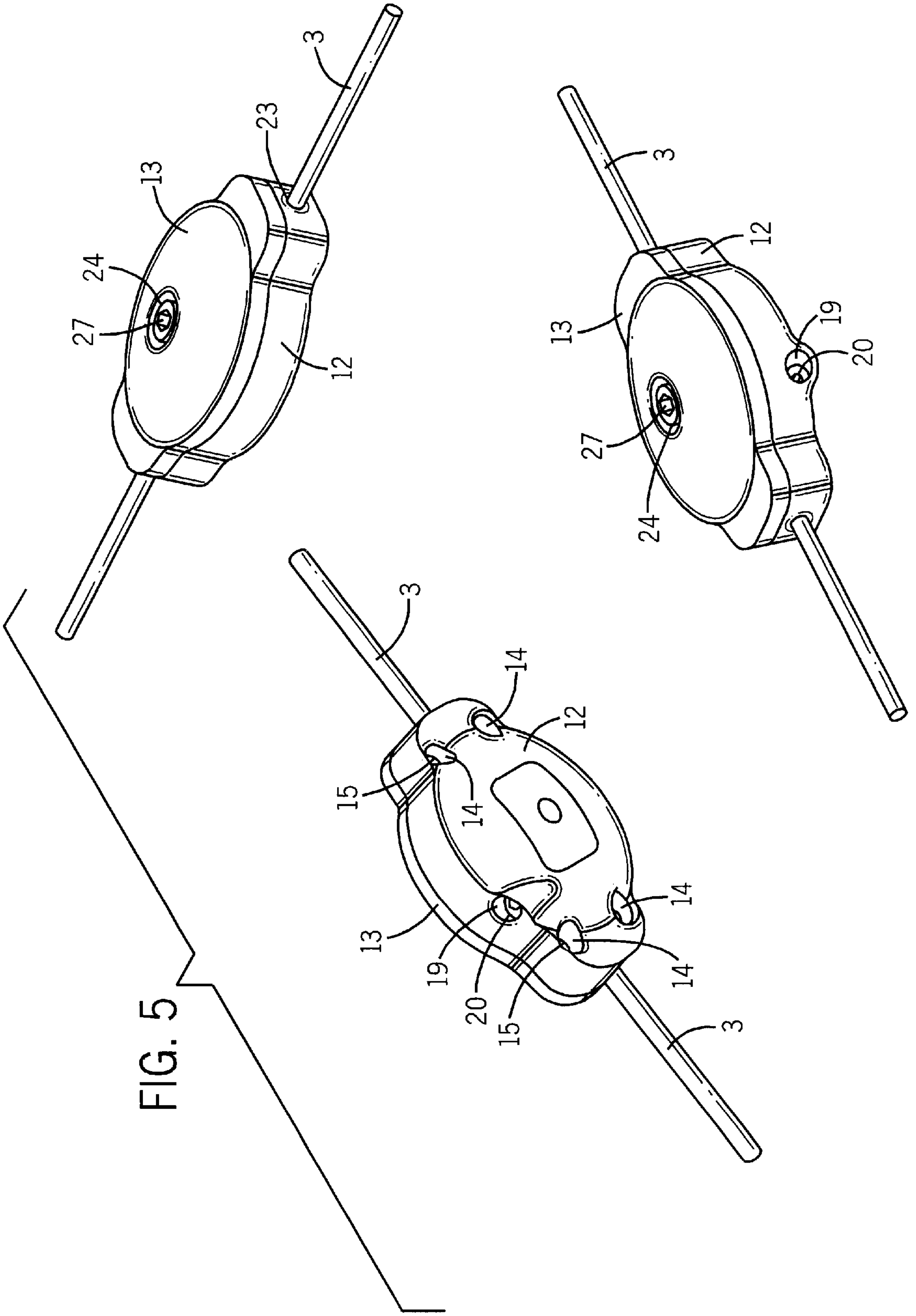
FIG. 5 shows perspective views of the tensioner from different viewpoints.

Referring to FIG. 1 of the accompanying drawings, there is illustrated a rope operated switch assembly comprising a first switch 1, a second switch 2, a rope 3 extending between the switches and a tensioner 4 installed along the rope.

The switches 1 and 2 are of any suitable design, and may be as described in WO-A-97/20334, for example. The switches are such that two tension thresholds are established. The first, lower threshold is such that unless the tension of the rope exceeds the first threshold the switch cuts off the supply of power required to enable the machinery to be operated. The second, higher threshold is such that unless the tension on the rope is less than the second threshold, the switch again acts to cut off the supply of power to the machinery. The switches 1, 2 each comprise a tension indicator 5, an emergency stop button 6, and a reset knob 7. Each switch also comprises a tubular body extension 8 which receives a spring-loaded shaft 50 (shown in phantom) attached to a rotatable D-ring connector 9. The switches are mounted such that the distance between the D-rings 9 is generally less than 75 meters.

The rope 3 is PVC coated steel cable, although any suitable rope may be used. The rope is attached between the switches 1, 2 by passing the rope around suitable thimbles looped through the rings 9 and clamping the rope ends in clamps 10, in a known manner. The rope is supported along its length by means of a plurality of eye bolts 11 placed at distances of 2 to 3 meters apart along the machinery.

The tensioner 4 is further illustrated in FIGS. 2 to 5. The tensioner comprises a base 12 and top 13. The base 12 comprises four apertures 14 to allow screws 15 to be screwed into corresponding threaded apertures (not shown) on the top 13 to hold the tensioner together. A pawl 16 is mounted on a spindle 17, and is acted on by a spring 18. A threaded aperture 19 allows a screw 20 to be screwed into engagement with the pawl 16, to push it against the biasing force of spring 18. A circular wall 21 is provided in the base to form a recess, the wall 21 having a section 22 of reduced height over which the pawl extends.

Two further apertures 23 are provided in base 12, one at either end thereof, to enable the tensioner to be threaded onto the rope 3.

A rotatable spindle 24 is provided in the tensioner, having an aperture 25 therethrough, and having a ratchet-toothed wheel 26 provided at one end thereof. The aperture 25 may be aligned with apertures 23 as shown so that the rope may be pushed through one aperture 23, the aperture 25, and the other aperture 23. A hexagonal recess 27 is provided in one end of the spindle 24 which extends through the top 13, suitable to allow the spindle to be turned using an Allen key. The end of the spindle having the recess 27 is further provided with an arrow-shaped indicator to indicate when the aperture 25 is aligned with the apertures 23. The ratchet-toothed wheel 26 sits in the circular recess created by wall 21 in the base 12.

A cover plate 28 is provided between the base 12 and top 13, having an aperture 29 in the centre thereof such that the spindle 24 may pass through the aperture leaving the toothed wheel 26 between the cover plate and the base 12 so that the aperture 25 is positioned between the cover plate and the top 13.

To install the rope operated switch assembly, the tensioner 4 is threaded onto the rope 3, and the rope is installed between switches 1 and 2. The rope 3 is pulled to an approximation of the correct tension during installation. The cover plate 28 allows the rope to be easily threaded through the tensioner 4 without becoming entangled in the toothed wheel 26 and pawl 16.

The tension in the rope 3 is then increased by turning the spindle 24 using an Allen key. This causes the rope extending through the spindle 24 to be wound about the spindle from both sides, thereby increasing the tension on the rope. The tension is maintained on the rope due to the ratchet and pawl preventing the spindle from turning in the wrong direction. The tension of the rope 3 is monitored by means of the tension indicators 5 provided on switches 1, 2. The tensioner 4 may be installed on the rope near to one of the switches so that it is easy for the operator to monitor the tension of the rope.

The tension may be released if necessary by tightening the screw 20, which pushes on the pawl 16 to release it from the ratchet-toothed wheel 26. The rope can then be pulled to release some of it from the tensioner, and the screw 20 can be unscrewed to re-set the ratchet and pawl. The tension in the rope may then be increased again by turning spindle 24.

If the tension in the rope alters over time, for example owing to temperature variations, friction and wearing of the rope caused by mis-aligned eye-bolts, etc, the tension may be simply re-set by either turning the spindle to tighten the rope, or by releasing the pawl to unlock the tensioner.

To operate the machinery, the tension of the rope is adjusted so that switches 1 and 2 are in the “run” position between the two tension thresholds. If the tension on the rope is then increased (i.e. by an operator pulling the rope), or decreased (i.e. if the rope is cut), the switches 1 and 2 are tripped, and the power to the machine is cut, preventing it from operating.

It should be appreciated that various modifications to the exemplary embodiment may be made. For example, the spindle may be held in position by a locking mechanism other than a ratchet and pawl.

The tensioner may be attached to only one end of the rope and connected to a switch by, for example, a hook passed through the ring 9. In this instance, the end of the rope that is connected to the tensioner would have to be securely attached to the spindle.

Although in the illustrated embodiment the tensioner is attached to the rope before the rope is connected to the or each switch, the tensioner could be attached to the rope after it has been installed, to allow for retro-fitting of existing rope operated switch assemblies. For example, the tensioner could comprise hooked attachment means that may be used to connect the tensioner to the rope, the rope becoming engaged in a separately rotatable member in the tensioner body.

Figure 6:
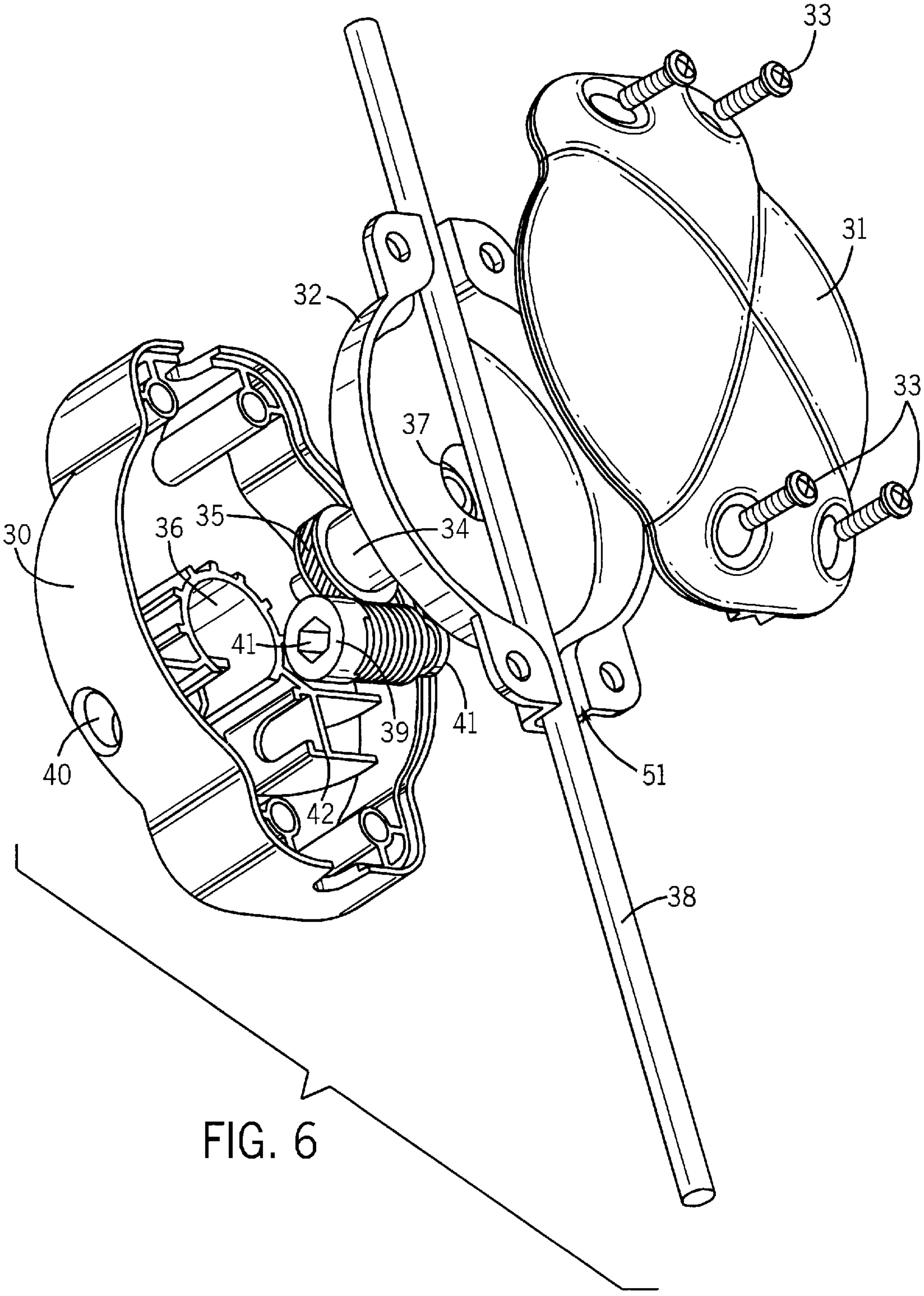
FIG. 6 is a perspective exploded view of a second embodiment of the present invention.

Referring now to FIG. 6, this illustrates an alternative embodiment of the invention. Whereas in the case of the embodiment of the invention illustrated in FIGS. 1 to 5 the spindle 24 is rotated by inserting a suitable tool into a recess provided in one end of the spindle, in the embodiment of FIG. 6 the rope is tensioned by rotating a spindle using a worm drive gear arrangement.

Referring in detail to FIG. 6, the illustrated embodiment of the invention comprises a base 30, a top 31, and an intermediate plate or rope confining partition 32 which is sandwiched between the base and top, the three components being secured together by screws 33 to form a body defining an open-ended passage 51 receiving the rope. A spindle 34 supports gear teeth 35, the spindle being received within a socket 36 moulded into the base 30 and extending through an opening 37 in the plate 32. The spindle 34 defines a hole 52 (see FIG. 8) through which a rope 38 to be tensioned is inserted.

A worm drive 39 aligned with an aperture 40 in the base has a flanged end 41 which is received in a socket 42 defined by the base. The worm 39 is retained between the base 30 and plate 32 and engages the gear 35. A tool may be inserted through the opening 40 to engage in a socket 41 defined in the end of the worm 39 to enable the rotation of the worm about its axis, such rotation causing the spindle 34 to rotate about its axis as a result of the interengagement of the worm 39 and the gear 35. Thus the rope 38 can be caused to wind around the spindle 34.

Figure 7:
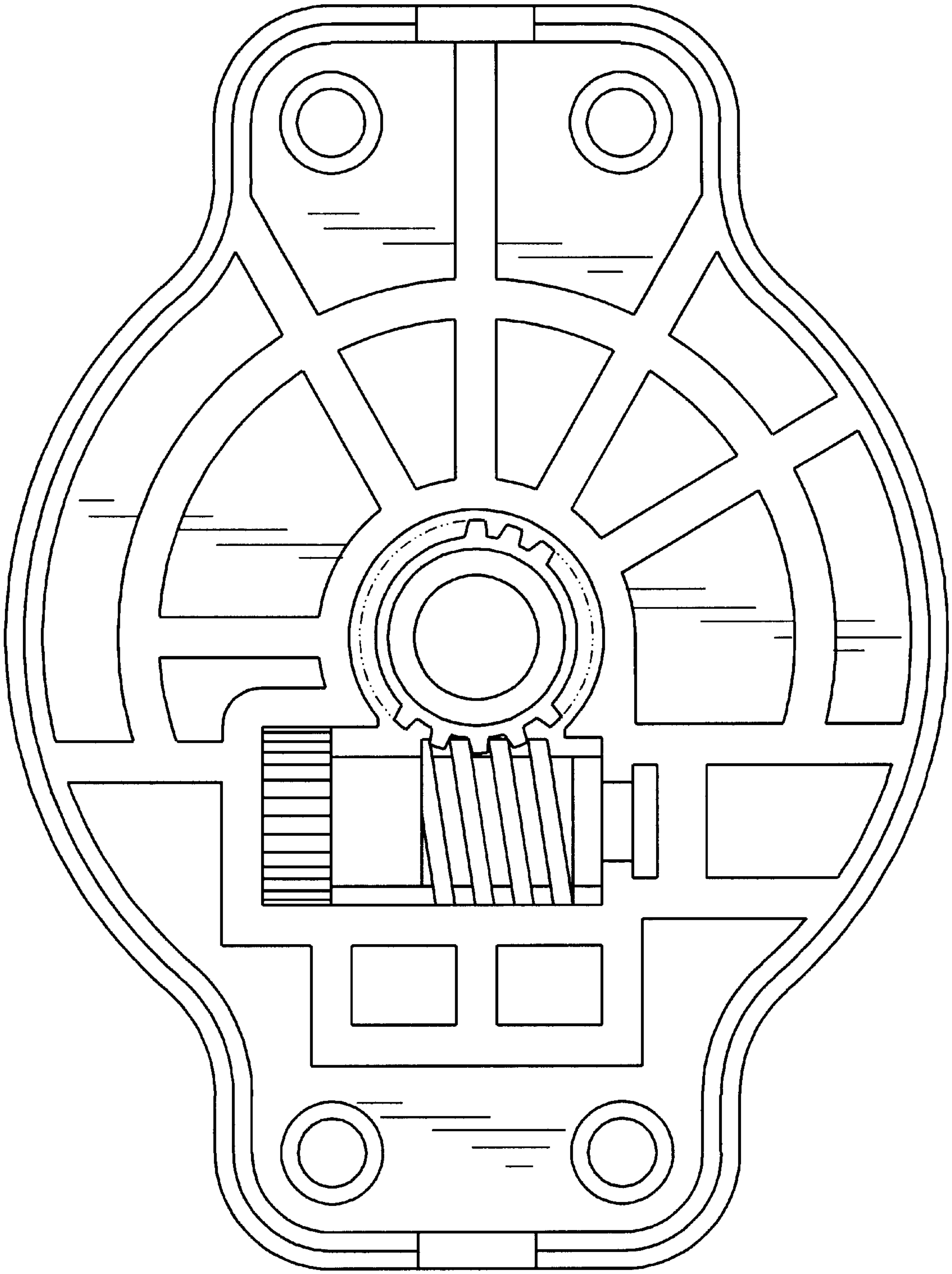
FIG. 7 is a view from above of a base component of the embodiment of FIG. 6 showing a spindle engaged by a worm drive.
Figure 8:
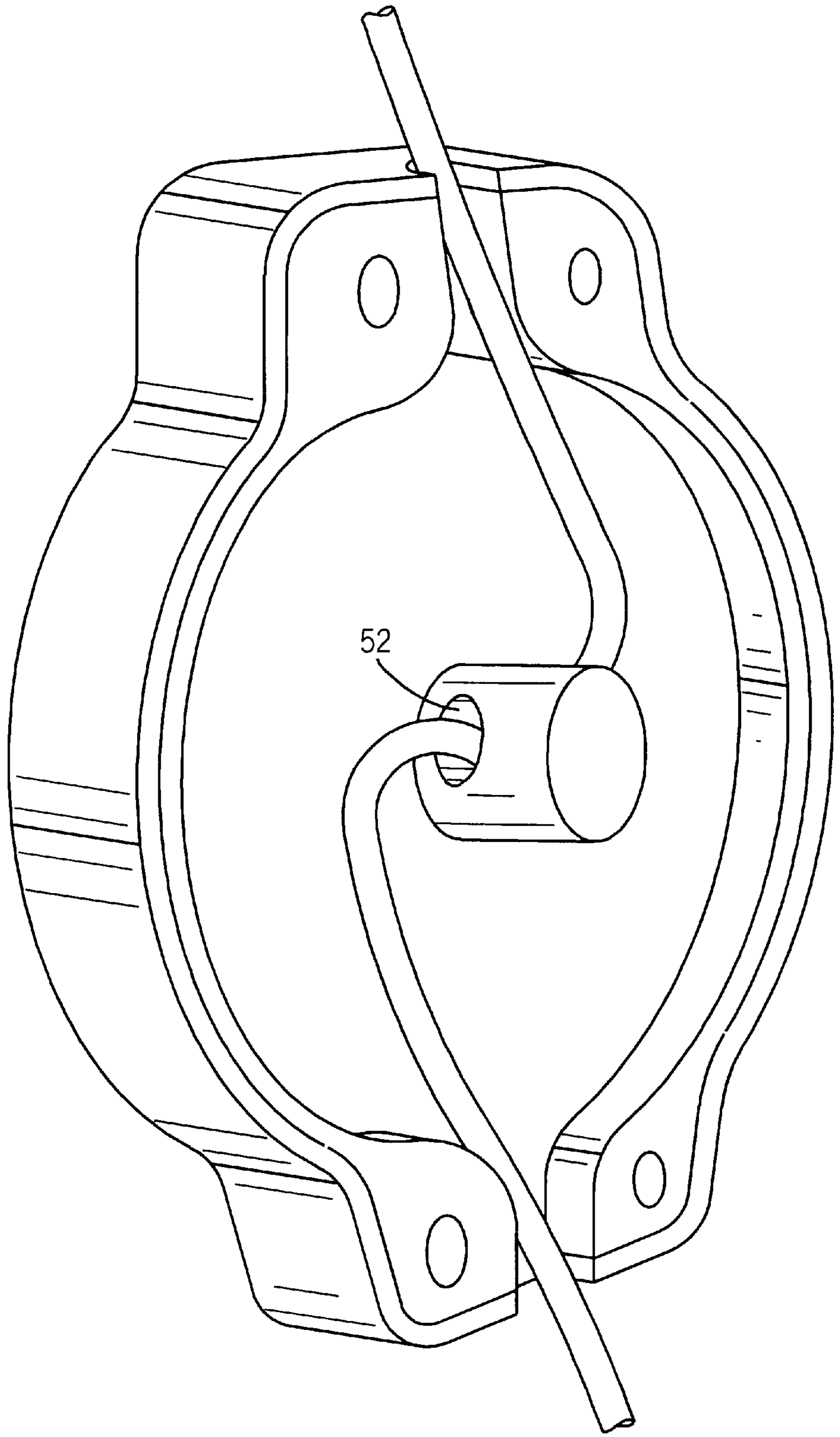
FIGS. 8 and 9 show the embodiment of FIG. 6 after removal of a cover and illustrating successive stages in the winding of a rope onto the spindle.
Figure 9:
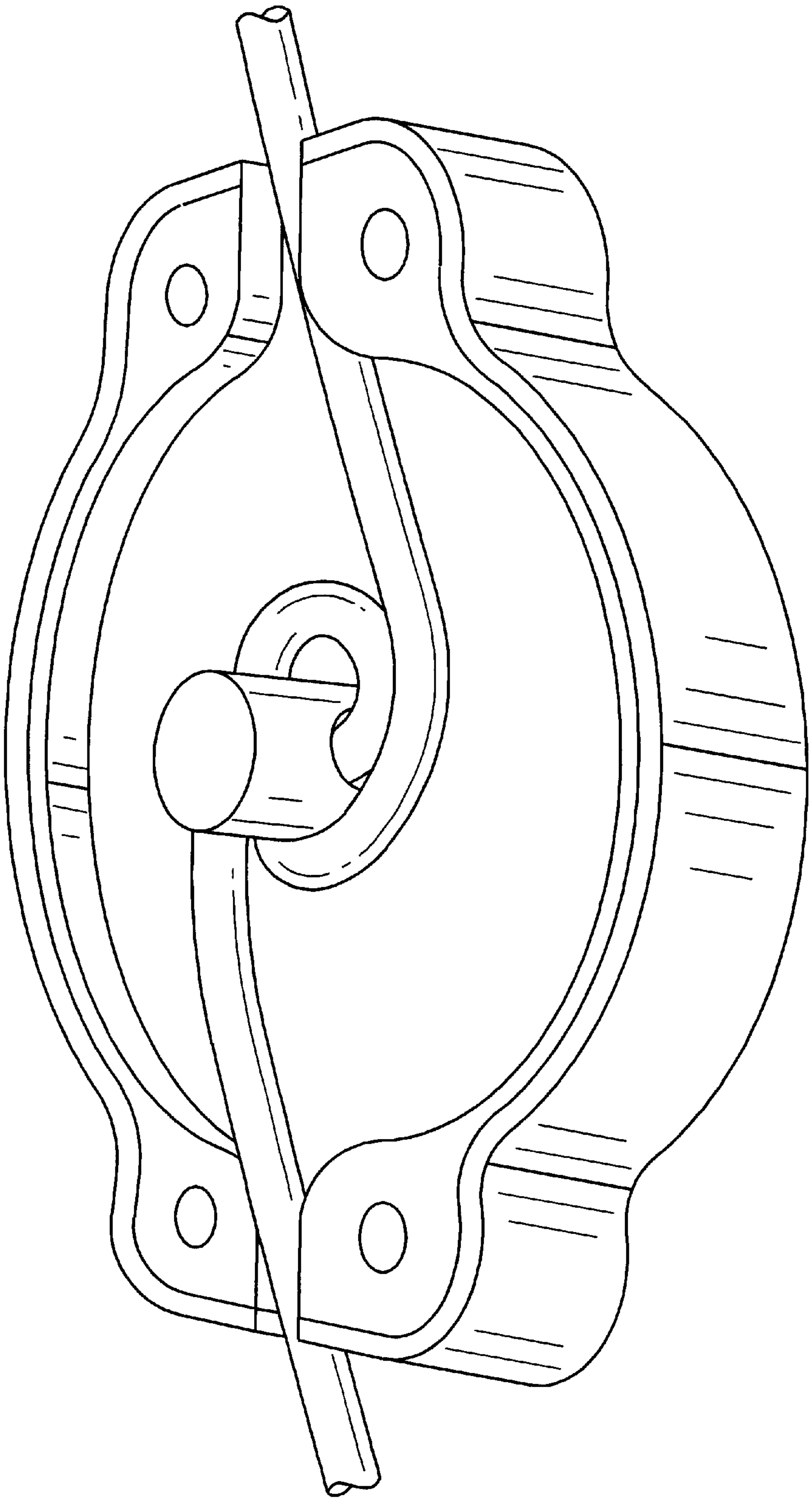

FIG. 7 shows the base 30, spindle 34.and worm drive 39 before the plate 32 is mounted on the base. FIGS. 8 and 9 show the embodiment of FIG. 6 after removal of the top cover 31 and insertion of a rope. FIG. 8 shows the rope wound around the spindle 34 after the spindle has been turned through slightly more than 90°, and FIG. 9 shows the rope after further rotation of the spindle. It will be appreciated that the manner in which the rope is wound around the spindle as shown in FIGS. 8 and 9 is the same as the manner in which a rope is wound around the spindle 24 in the embodiment of FIGS. 1 to 5.

In contrast to the embodiment of FIGS. 1 to 5, in the case of the embodiment of FIG. 6 tension in the rope can be closely controlled as a rotation through 360° of the worm 39 causes a relatively smaller rotation of the spindle 34. Furthermore, the mechanical advantage provided by the gearing system can be such that it is unnecessary positively to lock the worm 39 in a position to which it has been rotated. This means that the installer can increase or decrease the rope tension by simple rotation of a tool inserted into the socket 41, enabling very fine adjustment to the rope tension. Additional locking means (not shown) may however be provided to positively lock the worm and spindle 5 in the positions to which they have been rotated.

I claim:

1. A rope tensioner comprising a body defining a passage through which a rope can be inserted to project from each end of the body, a member rotatable relative to the body and formed to engage the rope extending through the passage such that rotation of the rotatable member causes the rope to be wound around a full periphery of the rotatable member, and a partition disposed within the body to confine the rope wound around the rotatable member.

2. A rope tensioner according to claim 1, further including a drive mechanically coupled to the rotatable member to rotate the rotatable member relative to the body.

3. A rope tensioner according to claim 2, wherein the drive member includes a first gear that meshes with a gear supported by the rotatable member.

4. A rope tensioner according to claim 3, wherein the first gear is a worm gear.

5. A rope tensioner according to claim 4, wherein the first gear and the gear supported by the rotatable member have a mechanical advantage such that unwinding of the rope from the rotatable member is prevented unless the first gear is rotated to drive the rotatable member in a direction to unwind the rope.

6. A rope tensioner according to claim 1, wherein the rotatable member is a spindle defining an aperture aligned with openings in the tensioner body.

7. A rope tensioner comprising a body defining a passage through which a rope can be inserted to project from each end of the body, a member rotatable relative to the body and formed to engage the rope extending through the passage such that rotation of the rotatable member causes the rope to be wound around the rotatable member, means for rotating the rotatable member relative to the body, the rotating means comprising a drive member mechanically coupled by a gear to the rotatable member, and a partition disposed within the body between the rope and the drive member.

8. A rope tensioner according to claim 7, wherein the drive member is a worm gear meshed with the gear supported by the rotatable member, the mechanical advantage of the gear system being such that unwinding of the rope from the rotatable member is prevented unless the drive member is rotated to drive the rotatable member in a direction to unwind the rope.

9. A rope tensioner according to claim 8, wherein the rotatable member is a spindle defining an aperture aligned with openings in the tensioner body.

10. A rope tensioner according to claim 7, wherein the rotatable member is a spindle defining an aperture aligned with openings in the tensioner body.

11. A rope tensioner comprising a body defining a passage through which a rope can be inserted to project from each end of the body, a member rotatable relative to the body and formed to engage the rope extending through the passage such that rotation of the rotatable member causes the rope to be wound around the rotatable member, and a partition disposed within the body to confine the rope wound around the rotatable member, wherein the rotatable member is a spindle defining an aperture aligned with openings in the tensioner body.

12. A rope tensioner comprising a body defining a passage through which a rope can be inserted to project from each end of the body, a member rotatable relative to the body and formed to engage a the rope extending through the passage such that rotation of the rotatable member causes the rope to be wound around the rotatable member, a first gear meshed with a gear supported by the rotatable member to rotate the rotatable member relative to the body, and a partition disposed within the body to confine the rope wound around the rotatable member.

13. A rope tensioner according to claim 12, wherein the first gear is a worm gear.

14. A rope tensioner according to claim 12, wherein the first gear and the gear supported by the rotatable member have a mechanical advantage such that unwinding of the rope from the rotatable member Is prevented unless the first gear is rotated to drive the rotatable member in a direction to unwind the rope.

15. A rope tensioner according to claim 12, wherein the rotatable member is a spindle defining an aperture aligned with openings in the tensioner body.

16. A rope tensioner comprising a body defining a passage through which a rope can be inserted to project from each end of the body, a member rotatable relative to the body and formed to engage the rope extending through the passage such that rotation of the rotatable member causes the rope to be wound around the rotatable member, a drive member mechanically coupled by a gear to the rotatable member to rotate the rotatable member relative to the body, and a partition disposed within the body between the rope and the drive member.

* * * * *